Oct. 31, 1961    W. R. LINKE ET AL    3,006,248
WIDE ANGLE OBJECTIVE
Filed Sept. 12, 1958
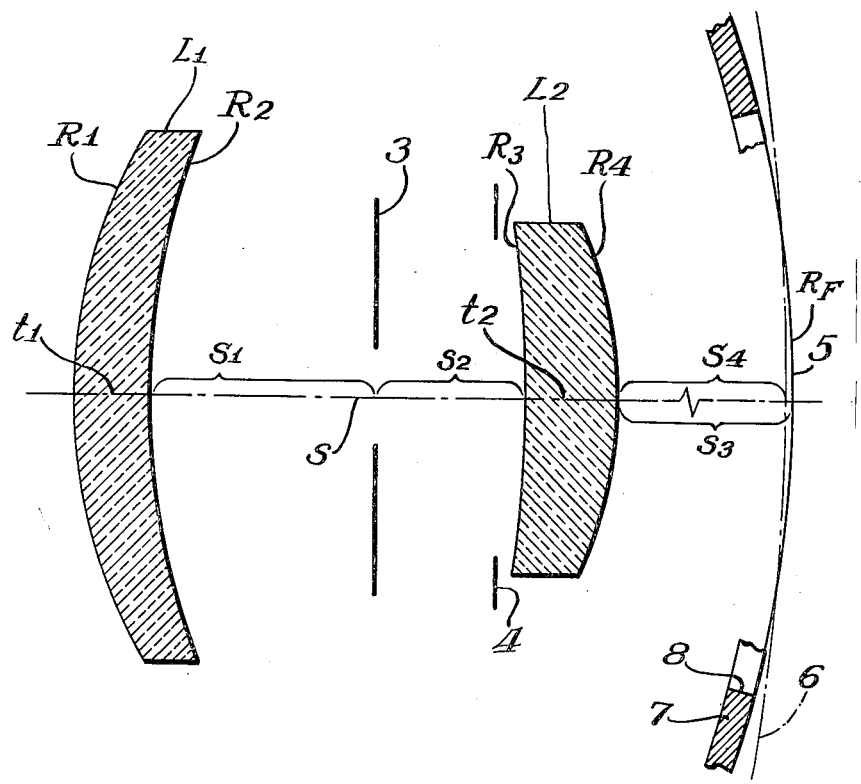
Inventors:
Walter R. Linke
Irving C. Sandback
By Robert E. Miehle, Jr. Atty.

3,006,248
WIDE ANGLE OBJECTIVE
Walter R. Linke, Chicago, and Irving C. Sandback, Morton Grove, Ill., assignors to Bell & Howell Company, Chicago, Ill., a corporation of Illinois
Filed Sept. 12, 1958, Ser. No. 760,697
2 Claims. (Cl. 88—57)

This invention relates to a camera, and more particularly to a camera having a wide angle objective corrected for astigmatism to an extent adapting the objective to a cylindrical film plane.

An object of the invention is to provide a camera having an optical objective corrected for spherical aberration, distortion, coma, and axial and lateral chromatic aberration, and so corrected as to curvature of field and astigmatism that sharp definition is provided on a curved film plane.

Another object of the invention is to provide a wide angle photographic optical system in which there is provided a two lens wide angle objective having substantial curvature of field along with a cylindrical film plane approximating the astigmatic correction curve in one dimension to provide sharp definition in that dimension.

Another object of the invention is to provide an unsymmetrical two lens objective having a center stop fixed in focus and having a large field of view.

A further object of the invention is to provide an objective having two meniscus singlet lenses positioned on opposite sides of a stop and both being concave to the stop. The lenses while of the symmetrical type are not completely symmetrical, and the objective is corrected for astigmatism only to an extent providing good definition on a cylindrical film plane.

It is to be understood that the terms "front" and "rear" as used herein refer to the ends of the objective respectively near the longer and shorter conjugates thereof.

In the accompanying drawing forming a part hereof, the single FIGURE is a horizontal section of a photographic optical system forming one embodiment of the invention.

The invention provides a camera having a wide angle objective having substantial curvature of field at the focal plane together with a cylindrical film plane approximating the astigmatism correction curve in the horizontal dimension so that sharp definition is provided along the horizon. The objective is of the generally symmetrical type and may include a front meniscus singlet concave to a stop positioned therebehind along with a rear meniscus singlet behind the stop and concave toward the stop. The rear singlet has substantially more power than the power of the front singlet.

Referring now in detail to the drawing, the objective is of the wide angle type and comprises a front component or lens $L_1$ in the form of a positive meniscus singlet and a rear component or lens $L_2$, which is also a positive meniscus singlet and of somewhat stronger power than the front component $L_1$. For best results the power of the lens $L_1$ should be less than half of that of the lens $L_2$, preferably about forty-four percent (44%). The components are concave to a stop or diaphragm 3 and a shutter 4, and, while the lens $L_2$ is stronger than the lens $L_1$, the objective is of the symmetrical type considered in its broader sense. Proceeding from front to rear, the lenses $L_1$ and $L_2$ have respective radii $R_1$ to $R_4$, axial thicknesses $t_1$ and $t_2$ and an axial separation $s$ with the lenses $L_1$ and $L_2$ being spaced axial distances $s_1$ and $s_2$, respectively from the stop 3.

Positioned behind the lens $L_2$ is a cylindrical film plane 5 having a radius $R_F$ spaced an axial distance $s_3$ from the lens $L_2$. A frame 7 having a rectangular opening 8 defines the area of the film to be exposed. The lenses $L_1$ and $L_2$ are so formed that the objective is corrected for spherical aberration, lateral and axial chromatic aberrations, distortion and coma. However, the objective is deliberately formed with an astigmatism correction and curvature of field surface 6 which is generally spherical and somewhat steeper than the cylindrical film plane so that excellent definition is provided over the entire exposed portion of the film defined by a film aperture 8 in a cylindrical aperture plate and film guide 7. Also, to achieve this, the film plane is deliberately spaced somewhat closer to the lens $L_2$ than focal plane of the objective.

The astigmatism correction surface 6, being steeper than the curve of the film plane 5 in the horizontal dimension, is located so that the axial separation $s_4$ of the surface 6 and the lens $L_2$ is less than the axial separation $s_3$ of the film plane 5 and the lens $L_2$ so that on the axis the astigmatism correction curve or surface 6 is in front of the film plane 5 a slight distance of from .010 to .020 inch for best results. However, since the surface 6 at which the astigmatism is fully corrected is somewhat steeper than the curve of the film plane 5, the surface 6 crosses over the film plane 5 and, at the outer portions of the frame or area which is to be exposed, the surface 6 is behind the film plane a slight distance. These slight spacings of the film plane 5 and the surface 6 along the horizontal dimension are very slight and very sharp definition is provided along the entire horizon.

In the vertical dimension, the surface 6 is in front of the film plane 5 throughout the area defined by the film aperture 8 in the film guide 7, and proceeding vertically outwardly from the axis of the objective, the separation of the film plane 5 and the surface 6 increases. However, even in the vertical dimension at the extreme upper and lower portions of the frame opening 8 where the separation of the film plane 5 and the surface 6 of astigmatism correction is the greatest, the separation between the plane 5 and the surface 6 is so small that the definition, while not as sharp as along the horizon, is excellent.

The aperture plate or film guide 7 is cylindrical about a vertical axis and the film rests against its righthand face so that the film is cylindrical at the film aperture 8. The portion of the film exposed by the film aperture in one constructed embodiment of the invention was 1⅝ inches wide and 1⅝ inches long.

A camera forming a preferred embodiment of the invention has the objective constructed in compliance with the following table in which dimensions are in terms of inches, and $n_d$ designates the respective indices of refraction for the sodium D line and V the Abbe dispersion numbers:

[Equivalent focal length=1.833. Back focal length=1.465. $R_F$=9.000
Film aperture=1⅝×1⅝]

| | | | | |
|---|---|---|---|---|
| $L_1$ | $R_1$=.934 | $t_1$=.140 | $n_d$=1.523 | V=58.6 |
| | $R_2$=1.392 | $s=s_1+s_2$=.772 | | |
| | | $s_1$=.447 | | |
| | | $s_2$=.325 | | |
| $L_2$ | $R_3$=−2.280 | $t_2$=.160 | $n_d$=1.523 | V=58.6 |
| | $R_4$=−.797 | $s_3$=1.454 | | |

The above objective is of the fixed focus type and provides sharp definition at an aperture of $f/8$ for a range of from about five feet to infinity. The objective also has a wide angle of field of view, about 62° in the example.

While the invention is thus described, it is not wished to be limited to the precise details described, as changes may be readily made without departing from the spirit of the invention.

What is claimed is:
1. In a camera, a stop, a cylindrical film plane, and an objective including a front component composed of a simple positive meniscus lens in front of and concave to the stop and a rear component composed of a simple positive meniscus lens behind and concave to the stop, and being further characterized in that the objective conforms substantially to the following table in which dimensions are in terms of inches, $L_1$ and $L_2$ designate the lenses, and proceeding from front to rear $R_1$ to $R_4$ the respective radii of curvature of the surfaces, $R_F$ the radius of curvature of the film plane, $t_1$ and $t_2$ the axial thicknesses, $s$ the axial separation, $s_1$ and $s_2$ the respective axial separations of the front lens and the stop and the rear lens and the stop, $s_3$ the axial distance between the rear lens and the film plane, and $n_d$ the respective indices for the D line and V the Abbe dispersion numbers:

[Equivalent focal length=1.833. Back focal length=1.465. $R_F$=9.000]

| | | | | |
|---|---|---|---|---|
| $L_1$ | $R_1$=.934 | $t_1$=.140 | $n_d$=1.523 | V=58.6 |
| | $R_2$=1.392 | $s$=.772 | | |
| | | $s_1$=.447 | | |
| | | $s_2$=.325 | | |
| $L_2$ | $R_3$=−2.280 | $t_2$=.160 | $n_d$=1.523 | V=58.6 |
| | $R_4$=−.797 | $s_3$=1.454 | | |

2. In an objective, a stop, a front component composed of a simple positive meniscus lens in front of and concave to the stop, and a rear component composed of a simple positive meniscus lens behind and concave to the stop, and being further characterized in that the objective conforms substantially to the following table in which dimensions are in terms of inches, and proceeding from front to rear $L_1$ and $L_2$ designate the lenses, $R_1$ to $R_4$ the respective radii of curvature of the surfaces, $t_1$ and $t_2$ the axial thicknesses, $s$ the axial separation, $n_d$ the respective indices for the D line and V the Abbe dispersion numbers:

[Equivalent focal length=1.833. Back focal length=1.465]

| | | | | |
|---|---|---|---|---|
| $L_1$ | $R_1$=.934 | $t_1$=.140 | $n_d$=1.523 | V=58.6 |
| | $R_2$=1.392 | $s$=.772 | | |
| $L_2$ | $R_3$=−2.280 | $t_2$=.160 | $n_d$=1.523 | V=58.6 |
| | $R_4$=−.797 | | | |

References Cited in the file of this patent

UNITED STATES PATENTS

| | | |
|---|---|---|
| 42,880 | Schnitzer | May 24, 1864 |
| 50,681 | Boyle | Oct. 31, 1865 |
| 79,323 | Dallmeyer | June 30, 1868 |
| 706,650 | Goerz | Aug. 12, 1902 |
| 1,082,678 | Casler | Dec. 30, 1913 |
| 1,584,098 | Holman | May 11, 1926 |
| 1,629,361 | Polack | May 17, 1927 |
| 1,933,783 | Wittel | Nov. 7, 1933 |
| 1,954,340 | Wood | Apr. 10, 1934 |
| 2,049,041 | Berggren | July 28, 1936 |
| 2,265,992 | Beck | Dec. 16, 1941 |
| 2,479,553 | Boecking | Aug. 23, 1949 |
| 2,586,418 | Davis | Feb. 19, 1952 |
| 2,789,489 | Zwakenberg et al. | Apr. 23, 1957 |

FOREIGN PATENTS

| | | |
|---|---|---|
| 454,347 | Germany | Jan. 6, 1928 |